(No Model.)
H. E. ROLPH.
WAGON BRAKE.
No. 243,977. Patented July 5, 1881.
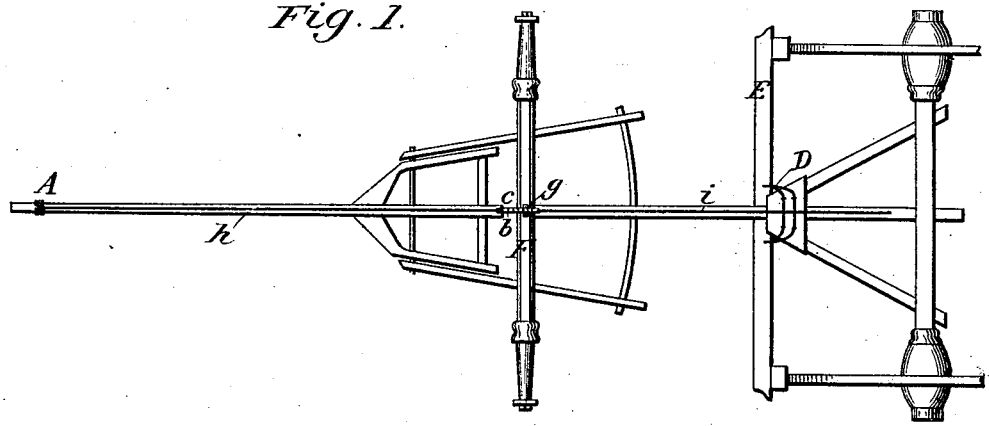
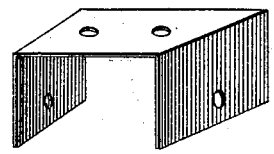
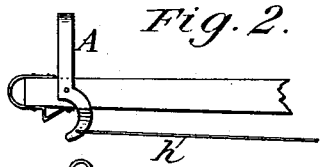
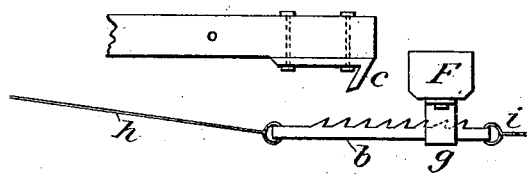
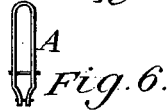
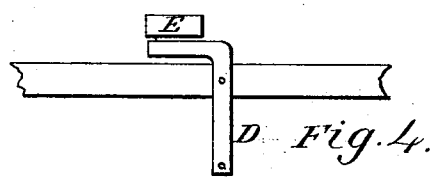
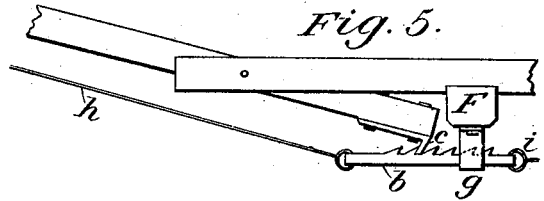
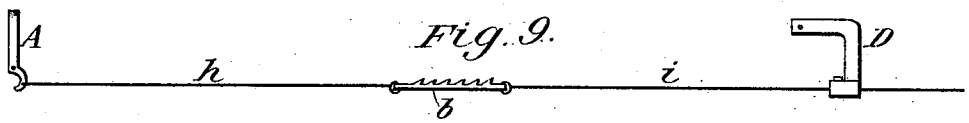
Witnesses: Inventor.

UNITED STATES PATENT OFFICE.

HENRY E. ROLPH, OF ISLAND LAKE, MINNESOTA.

WAGON-BRAKE.

SPECIFICATION forming part of Letters Patent No. 243,977, dated July 5, 1881.

Application filed July 28, 1880. (No model.)

*To all whom it may concern:*

Be it known that I, HENRY E. ROLPH, a citizen of the United States, residing at Island Lake, in the county of Lyon and State of Minnesota, have invented a new and useful Improvement in Brakes for Wagons, of which the following is a specification.

The object of my invention is to supply a simple, durable, effective, and reliable brake, and one that may be adjusted to any length of reach, so as to suit all kinds of loading; and, also, one that will act when needed and no longer, with but little inconvenience to the team, and not requiring attention of the teamster; a brake that may be attached to any double wagon without impairing its strength or appearance, and greatly enhance the safety of both wagon and team. This object is fully attained by a combination of levers acting simultaneously, as shown in the accompanying drawings, in which—

Figure 1 represents part of a wagon inverted (or upper side down) in order to show the connection between the lever A, near the point of the tongue, and levers D at the junction of the hounds. The rod $h$ extends from the lower arm of lever A to ratchet $b$. This ratchet passes through a staple, $g$, beneath the axle F, and another rod, $i$, completes the connection between the levers A and D. E represents the brake-bar with friction-blocks against the wheels, as when in action.

Fig. 2 is a side view of lever A in its proper position upon the tongue, and part of the rod $h$.

Fig. 3 represents the form and position of the ratchet $b$, suspended, by the staple $g$, beneath the axle F, and its connection with the rods $h$ and $i$, also the dog $c$ attached to the end of tongue.

Fig. 4 is a side view of the lever D, showing its form and the position of the brake-bar E upon its upper arm, and the attachment with the rod $i$ and the hounds.

Fig. 5 is a side view of the dog $c$ grappled with the ratchet $b$.

Fig. 6 is a front view of lever A with its bolts.

Fig. 7 is a front view of levers D with bolts. These levers are double.

Fig. 8 represents the form of clasp for the purpose of attaching levers D to the hounds.

Fig. 9 represents the full connection between levers A and D, composed of rod $h$, ratchet $b$, and rod $i$.

The construction is as follows: The lever A is made of a flat bar of iron looped, as shown in Fig. 6, with holes for bolts, the upper arm to be of sufficient length to reach as high as the neck-yoke, the lower arm being only about half as long—three inches—the rod $h$ to be of sufficient length to extend from lever A to ratchet $b$, with loops at the ends. The ratchet is plainly shown at $b$. The rod $i$ should have a loop or eye at one end to connect it with the ratchet, and should be of sufficient length for the longest reach or coupling required. The levers D form a pair, with upper arms bent forward, as seen in Fig. 4, and the lower arms bent, as seen in Fig. 7, so that when one is placed on either side of the hounds the lower arms can meet beneath the hounds at the rod $i$, to which they (the levers D) are attached by a set-screw. The clasp, Fig. 8, passes over the hounds (being fastened to them by bolts) and down each side of the hounds, so that the levers D may be attached by a bolt passing through them and the ends of the clasp beneath the hounds. The brake-bar E, (a two-by-four scantling,) of sufficient length to extend a little past each wheel, as shown in Fig. 1, is attached by eyebolts to levers D, as shown in Fig. 4, forming a hinge or oscillating joint. The staple $g$ may be screwed on or driven into the axle F.

The operation is as follows: On descending a hill the upper arm of lever A comes in contact with the neck-yoke and is forced backward, causing the lower arm to move forward, which being attached to the levers D causes them to act simultaneously with lever A, thereby applying the brake. As soon as the wagon ceases to press forward the weight of the brake-bar causes the levers to regain an upright position and the brake to recede from the wheels. When backing the wagon the brake is forced toward the wheels in the same manner, but the reverse motion of the wheels raises the brake-bar on its hinges, thereby avoiding the friction. The upper arm of lever A and the lower arm of lever D being much longer than the other arms increases the force or purchase proportionately. The dog $c$ and the ratchet $b$ act only when the tongue is elevated by more than ordinary pressure, and may in most cases be dispensed with.

I am aware that automatic brakes have been used prior to my invention; therefore I do not broadly claim the same; but, Having fully described my said invention, what I do claim, and desire to secure by Letters Patent, is—

The improved wagon-brake herein described, consisting of the levers A and D, adjustably connected by the rods $h$ and $i$, the ratchet $b$, dog $c$, staple $g$, and set-screw for adjusting rod $i$ to different lengths of reach, the single brake-bar E, hinged to lever D, and a suitable clasp attaching the lever and wagon-hounds, all combined, arranged, and operating substantially as shown, for the purpose set forth.

HENRY E. ROLPH.

Witnesses:
D. P. HANCE,
L. S. KIEL.